(12) United States Patent
Tignor et al.

(10) Patent No.: US 6,836,396 B1
(45) Date of Patent: Dec. 28, 2004

(54) WORLD WIDE WEB ENABLED AND DIGITAL RATING PLUG

(75) Inventors: Michael S. Tignor, Watertown, CT (US); Patrick Salas, Unionville, CT (US); Craig B. Williams, Avon, CT (US); Michael B. Bradley, Farmington, CT (US); David Fletcher, Simsbury, CT (US)

(73) Assignee: General Electric Company, Schenectady, NY (US)

(*) Notice: Subject to any disclaimer, the term of this patent is extended or adjusted under 35 U.S.C. 154(b) by 465 days.

(21) Appl. No.: 09/660,876

(22) Filed: Sep. 13, 2000

(51) Int. Cl.[7] ................................................ H02H 9/04
(52) U.S. Cl. ..................................... 361/83.3; 361/93.2
(58) Field of Search ............................. 361/93.3, 93.4,
361/115, 116, 93.6, 93.1, 93.2, 93.5, 93.7,
93.8, 93.9

(56) References Cited

U.S. PATENT DOCUMENTS

| | | | |
|---|---|---|---|
| 3,710,302 A | 1/1973 | Shannon et al. | |
| 4,066,960 A | 1/1978 | Milkovic | |
| 4,371,908 A | 2/1983 | Andow et al. | |
| 4,649,455 A | 3/1987 | Scott | 361/93 |
| 4,672,501 A | 6/1987 | Bilac et al. | 361/96 |
| 4,675,641 A | 6/1987 | Hampton et al. | 337/82 |
| 4,720,802 A | 1/1988 | Damoulakis et al. | |
| 4,728,914 A * | 3/1988 | Morris et al. | 335/6 |
| 4,783,748 A | 11/1988 | Swarztrauber et al. | |
| 4,809,125 A * | 2/1989 | Matsko et al. | 361/93.3 |
| 4,958,252 A | 9/1990 | Murphy | 361/93 |
| 5,027,091 A | 6/1991 | Lesslie et al. | 335/132 |
| 5,136,457 A | 8/1992 | Durivago, III | 361/93 |
| 5,392,016 A | 2/1995 | Arnold et al. | 335/176 |
| 5,424,701 A | 6/1995 | Castonguay et al. | 335/172 |
| 5,463,749 A | 10/1995 | Wertheizer et al. | |
| D365,329 S | 12/1995 | Seymour et al. | D13/162 |
| 5,561,610 A | 10/1996 | Schricker et al. | |
| 5,619,014 A | 4/1997 | Faulkner | |
| 5,657,193 A * | 8/1997 | Purkayastha | 361/123 |
| 5,682,888 A | 11/1997 | Olson et al. | |
| 5,797,483 A | 8/1998 | Smith et al. | 200/401 |
| 5,877,925 A | 3/1999 | Singer | 361/42 |
| 5,943,201 A * | 8/1999 | Walker et al. | 361/64 |
| 6,014,465 A | 1/2000 | Blixt et al. | |
| 6,111,486 A * | 8/2000 | Fischer et al. | 335/42 |
| 6,182,022 B1 | 1/2001 | Mayle et al. | |
| 6,292,717 B1 * | 9/2001 | Alexander et al. | 700/293 |
| 6,433,982 B1 * | 8/2002 | Santos | 361/93.2 |
| 6,560,084 B1 * | 5/2003 | Bilac et al. | 361/93.1 |
| 2001/0000355 A1 * | 4/2001 | Santos et al. | 702/58 |
| 2001/0019573 A1 * | 9/2001 | Dougherty et al. | 374/4 |

* cited by examiner

*Primary Examiner*—Brian Sircus
*Assistant Examiner*—Danny Nguyen
(74) *Attorney, Agent, or Firm*—Cantor Colburn LLP

(57) ABSTRACT

Improvements to a rating plug for an electronic trip unit of a circuit breaker are disclosed. The rating plug includes a non-volatile memory which has access to current and frame rating information. A microcomputer in the electronic trip unit may receive new current rating information over the World Wide Web from a vendor system to update the current rating information of the rating plug. A program within the circuit breaker may detect errors in the new current rating information and may reject such and revert to a safe mode of operation. A billing system may be connected to the vendor system for calculating charges based on the transmission of the new current rating information. Preferably, the non-volatile memory of the rating plug is programmed at the factory site and a label adhered to the outer case of the rating plug for indicating the current rating. The rating plug may then be inserted within the electronic circuit breaker at the field and the current rating altered as necessary using the remote altering system.

18 Claims, 6 Drawing Sheets

WORLD WIDE WEB ENABLED AND DIGITAL RATING PLUG

BACKGROUND OF THE INVENTION

This invention relates generally to rating plugs for electronic trip units in circuit breakers, and more particularly, this invention relates to a world wide web enabled rating plug for modifying the rating plug via the world wide web and a digital rating plug that has a programmable memory for storing scaling and optioning data.

Circuit breakers are widely used to protect electrical lines and equipment. The circuit breaker monitors current through an electrical conductor and trips to interrupt the current if certain criteria are met. One such criterion is the maximum continuous current permitted in the protected circuit. The maximum continuous current the circuit breaker is designed to carry is known as the frame rating. However, the breaker can be used to protect circuits in which the maximum continuous current is less than the circuit breaker frame rating, in which case the circuit breaker is configured to trip if the current exceeds the maximum continuous current established for the particular circuit in which it is used. This is known as the circuit breaker current rating. Obviously, the circuit breaker current rating can be less than but cannot exceed the frame rating.

An electronic trip unit ("ETU") is a device that is used in conjunction with an electromechanical circuit breaker to control the current verses time trip response. The time versus current trip characteristics are, in part, a function of the maximum continuous current permitted by the circuit breaker. This maximum continuous current is also called the current rating of the circuit breaker. As long as the current remains below this maximum continuous current rating, the breaker will remain closed. Momentary low magnitude excursions above the rated current are tolerated; however, persistent overcurrents result in tripping of the breaker. The time delay and generation of the trip signal is an inverse function of the magnitude of the current. For very large magnitude overcurrents, such as would be produced by a fault, the microcomputer is programmed to generate a trip signal instantaneously.

The modification of the current vs. Trip time response curve is a serious matter. For safety purposes, the circuit breaker must be properly configured to provide the type of protection judged by the customer or plant engineer to be appropriate. Therefore the modification to this protection must also be considered to be a very serious event and handled in a way that prohibits errors.

Typically, the circuit breaker current rating is set by a rating resistor (a "burden resistor") which is selected to generate a preset voltage when a current proportional to the maximum continuous current permitted in the protected circuit passes through the rating resistor. In order to provide for adjustment of the current rating so that the circuit breaker can be used to protect circuits with different maximum continuous currents, it is known to incorporate the rating resistor in a replaceable rating plug which may be selectively inserted into the breaker.

Field replaceable rating plugs are known. These plugs are field installable and may be mechanical for use with thermal-magnetic trip units or may use a combination of analog circuit scaling and digital techniques to change the ETU response. It is typical for these plugs to provide mechanical rejection of plugs that are not suited to certain ranges or frame sizes.

In current designs of ETU it is typical to utilize an electronic signal scaling method that was either completely analog or a combination of analog and digital methods. Scaling of current sensor signals with resistors is an error prone technique. These resistors are placed on the plug-in module that uses an electrical connector. These connectors have a contact resistance that becomes part of the circuit. The variation in the connector resistance can cause error in the analog circuit.

Electronic trip circuit interrupters are designed to interrupt overcurrent conditions over a wide range of ampere ratings. The current through the protected electric power circuit is continuously sensed by means of current transformers and a voltage signal is supplied to the signal processor within the ETU circuit by means of so-called "burden resistors", such as rating resistors in a rating plug. The size of the burden resistor accordingly sets the ampere rating of the corresponding circuit interrupter. A common electronic circuit interrupter could therefore operate over a wide range of ampere ratings by merely changing the value of the burden resistor within the electronic trip circuit. It is important to prevent an electronic circuit interrupter from being inserted within an electrical distribution circuit for which the circuit interrupter is over-rated. It is perhaps equally important not to insert a circuit interrupter within an electric power distribution circuit for which the circuit interrupter is under-rated, as so-called "nuisance-tripping" could occur. It is also important to insure that a circuit interrupter is not inserted within an electric power distribution circuit with no rating plug or burden resistor whatsoever.

Another problem with scaling those use resistive circuits is that there needs to be many different circuit variations with different valued resistors for each range. Currently, it is known to use resistors for analog circuit scaling and digital techniques that indicate to a microprocessor that there is a resistor in the scaling circuit of a specific value. Then the microprocessor can recalibrate its response based upon this resistor value. Errors, however, are commonplace with analog methods that use resistors.

U.S. Pat. No. 4,958,252 to Murphy discloses a removable rating plug having memory. The memory is used to store service data of the circuit breaker for determining its mechanical wear and electrical damage. For reading the number of operations of the operating mechanism and the trip history of the circuit breaker, or for changing information in the rating plug, the rating plug must be removed from the circuit breaker and plugged into a programmer device. Not only does this interrupt service of the circuit breaker, but it also necessitates the services of a skilled on-site technician.

BRIEF SUMMARY OF THE INVENTION

The above discussed and other drawbacks and deficiencies are overcome or alleviated by a system for changing the rating plug information of a circuit breaker, the system comprising a circuit breaker having an electronic trip unit, a microcomputer in the electronic trip unit, and a rating plug having a non-volative memory storing current rating and frame rating of the circuit breaker, a first internet connection for connecting the circuit breaker to the world wide web, a vendor subsystem, and, a second internet connection for connecting the vendor sub-system to the world wide web, wherein the vendor sub-system and the microcomputer are communicable via the first and second internet connections for altering current rating of the circuit breaker by sending new data from the vendor sub-system to the microcomputer and then to the non-volative memory.

The above discussed and other drawbacks and deficiencies are also alleviated by a plug-in digital rating plug for an electronic trip unit of a circuit breaker, the rating plug comprising a housing, a connector for connecting the rating plug to the electronic trip unit, and, a non-volatile memory storing current rating of the circuit breaker, wherein the rating plug sends only digital information to the electronic trip unit.

The above discussed and other features and advantages of the present invention will be appreciated and understood by those skilled in the art from the following detailed description and drawings.

BRIEF DESCRIPTION OF THE DRAWINGS

Referring to the FIGURES wherein like elements are numbered alike in the several FIGURES.

DETAILED DESCRIPTION OF THE PREFERRED EMBODIMENTS

Figure 1:
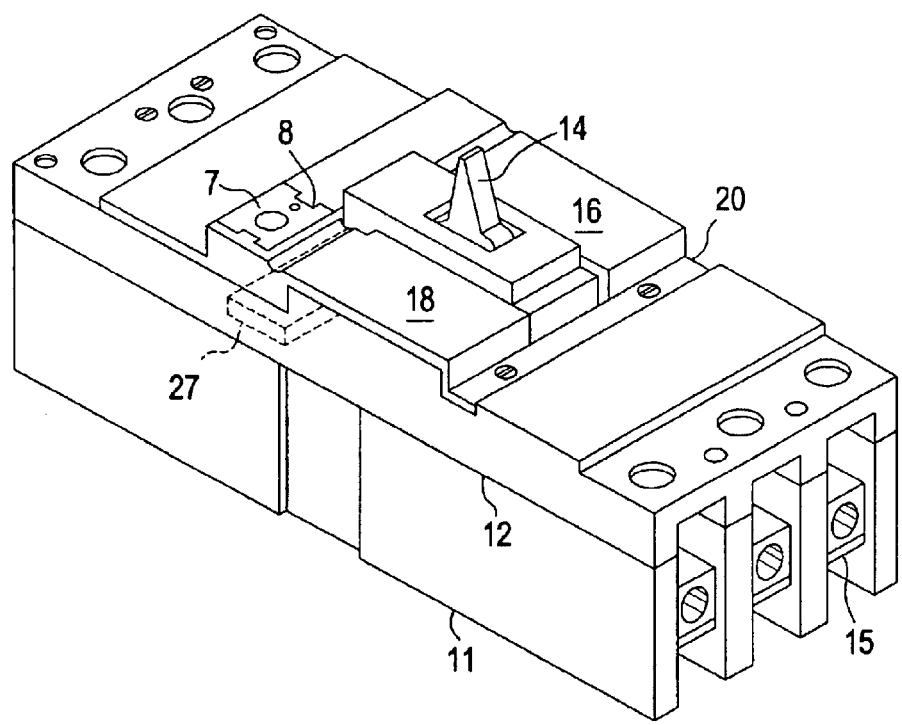
FIG. 1 is a top perspective view of an electronic circuit breaker according to the prior art.

The circuit breaker 10 shown in FIG. 1 contains an electronic trip unit 27. The circuit breaker consists of an electrically insulated case 11 to which a cover 12 of similar insulative material is attached. An external handle 14 allows the circuit breaker to be turned ON and OFF independent of the electronic trip unit 27 contained within the cover. Electrical connection with the interior current-carrying components is made by load terminal straps 15 extending from one side of the case 11 and then through the line terminal straps 13 (not shown) extending from the opposite side thereof. A pair of accessory doors 18, 16 allow for the provision of field installable accessories. A rating plug 7 extends within the rating plug receptacle 8 within the circuit breaker accessory cover 20 and connects with the circuit breaker trip unit 27 to set the circuit breaker ampere rating. Although a three-phase molded case circuit breaker is shown, it should be appreciated that the invention is applicable to other types of circuit breakers, including those with more or less phases.

Figure 2:
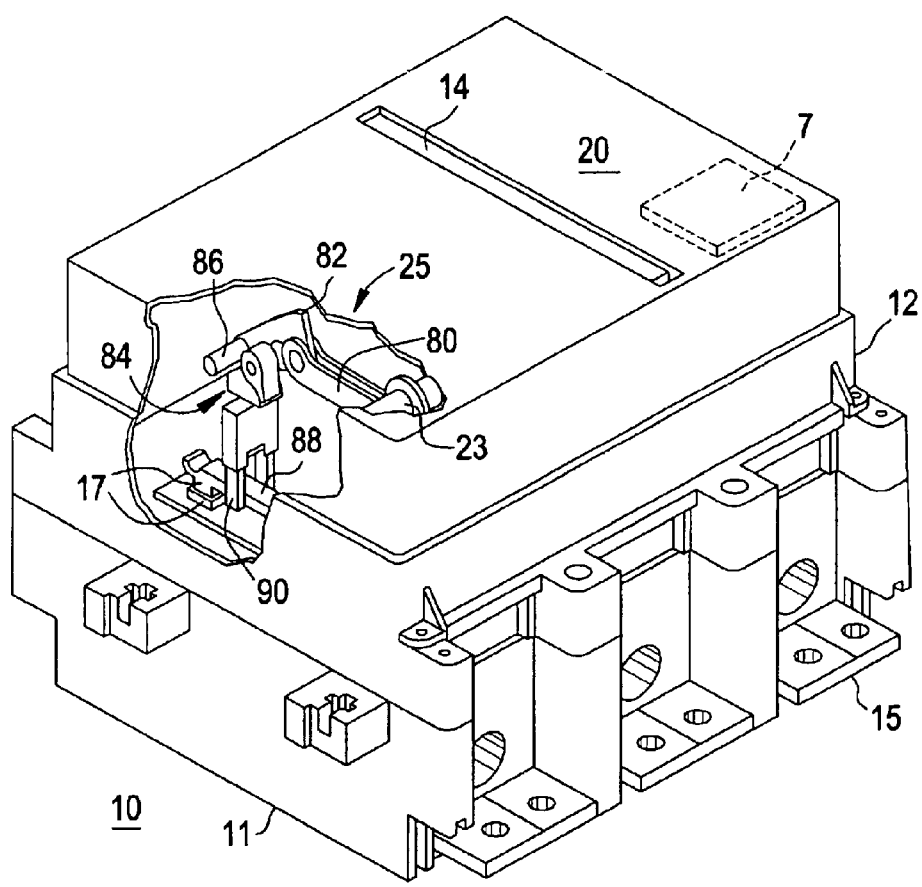
FIG. 2 is a top perspective view of the circuit breaker of FIG. 1 with the circuit breaker operating mechanism made visible.

FIG. 2 shows a portion of an exemplary operating mechanism for separating the circuit breaker movable and fixed contacts 17. An exemplary rating plug 7 is shown for connecting with a circuit breaker trip unit 27. A drive shaft or trip bar 23 connects with the opening link 80 by means of the crank 82. In accordance with the invention, a contact carrier drive linkage 84, hereinafter "linkage", connects with the crank 82 by means of a pivot pin 86 with the movable contact arm 88 via the pivot pin 90. The contacts 17 and other current-carrying components are contained within the circuit breaker base 11 and are insulated from the operating mechanism components within the top cover 12. Electrical isolation between the operating mechanism or trip mechanism 25 and the movable contact arm 88 is assured by the arrangement of the components, not shown, contained within the linkage 84. Other types of operating mechanisms are also within the scope of this invention, including, but not limited to, rotary contact arrangements.

Figure 3:
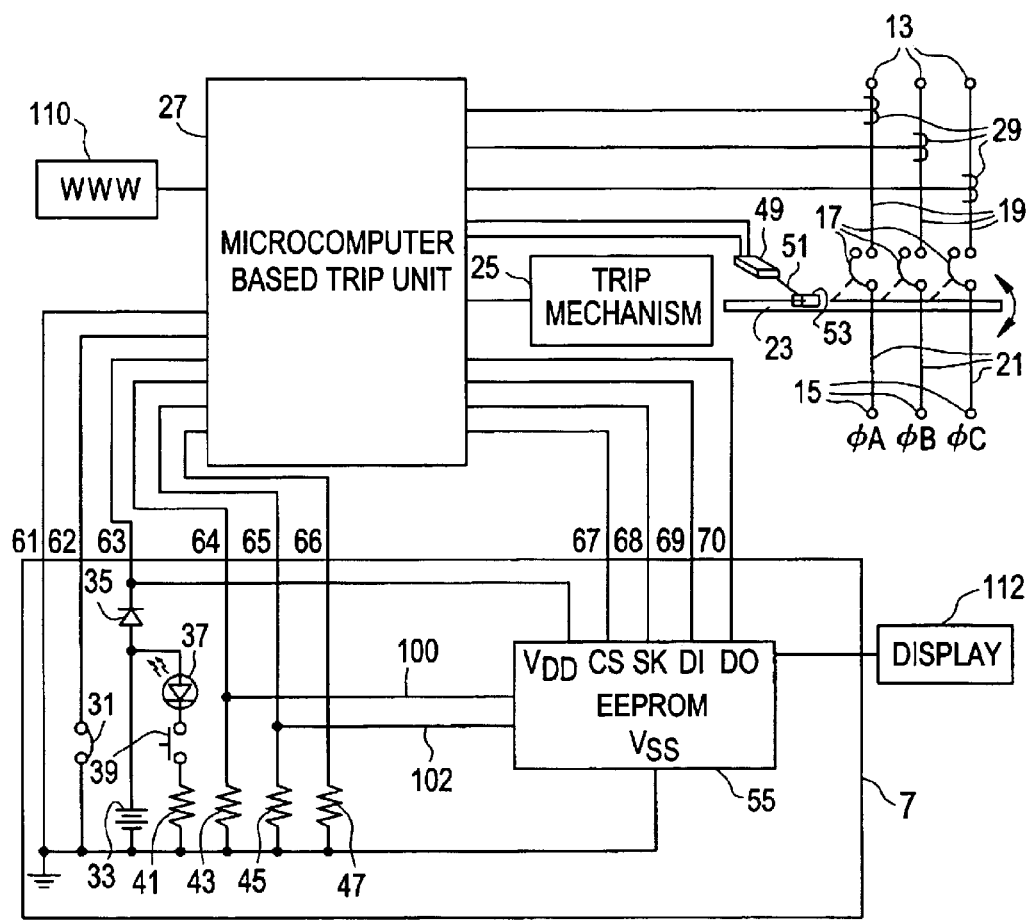
FIG. 3 is a schematic circuit diagram of the present invention usable in the circuit breaker of FIG. 1.

As shown in FIG. 3, the circuit breaker 10 includes line terminals 13 for connection to a three-phase (phases A, B, and C) source of ac power (not shown) and corresponding load terminals 15. The circuit breaker 10 also includes a set of contacts 17 for each phase A, B, and C connected to the line terminals by leads 19 and connected to the load terminals by the conductors 21. The contacts 17 are operated by a trip bar 23 which in turn is operated by a trip mechanism 25. The trip mechanism is controlled by a microcomputer based trip unit 27. The microcomputer based trip unit 27 monitors the phase currents through the current monitors 29, and is programmed to implement predetermined time versus current tripping characteristics which result in actuation of the trip mechanism 25 which opens the contacts 17. A micro-switch 49, having an actuation arm 51 which is operated by a cam 53 on the trip bar 23 of the circuit breaker 10, may send signals to the microcomputer based trip unit 27 for counting the number of mechanical operations of the operating mechanism, which is proportional to the wear exerted on the circuit breaker 10.

As further shown in FIG. 3, the rating plug 7 may have pins which connect the rating plug 7 with the microcomputer based trip unit 27. The pin 61 may be a common ground. Pin 62 may connect a removable jumper 31 which if present may indicate that the circuit breaker is connected in a 60 Hz installation, for example, and if absent, identifies a 50 Hz installation, for example. The removable rating plug 7 may also be provided with a battery 33 protected with a blocking diode 35 which is connected with the microcomputer based trip unit 27 through pin 63. This battery 33 may provide power to LED indicators (not shown) controlled by the microcomputer based trip unit 27 when the circuit breaker 10 is tripped. This battery 33 may further be necessary in an installation where the circuit breaker 10 is powered by the protected circuit, and thus, where power is lost when the circuit breaker 10 is tripped. An LED 37 in the rating plug 7 may provide an indication of the condition of the battery 33 when the test button 39 is depressed. A resistor 41 limits the current through the LED 37. Pins 62 and 63 and their associated elements are optionally provided.

The rating plug 7 may also include three precision resistors 43, 45, 47, which are connected to the common ground and through pins 64, 65, 66, respectively, to the microcomputer based trip unit 27. The resistor 43 provides a reference for the microcomputer for the frame rating of the circuit breaker. The resistor 45 establishes the current rating of the circuit breaker by providing a reference to the microcomputer for the maximum continuous current. The value of this resistor is selectable to set the desired current rating. The resistor 47 is a calibration resistor for the microcomputer based trip unit 27.

A non-volatile memory 55, such as an erasable electrically programmable read only memory (EEPROM), is provided in the rating plug 7. The EEPROM 55 is powered through the input $V_{DD}$ and is connected to the common ground through input $V_{SS}$. The EEPROM 55 may also have a chip select input CS, a serial clock input SK, a data in terminal DI through which the EEPROM receives data from the microcomputer, and a data output terminal, DO through which data in the EEPROM is read by the microcomputer.

The CS, SK, DI, and DO terminals are connected to the microcomputer through pins 67, 68, 69, and 70, respectively, of the rating plug 7.

Further transmitted to the EEPROM 55 is information regarding the resistors 43 and 45 through leads 100 and 102. That is, the frame rating of the circuit breaker and current rating of the circuit breaker is made available to the EEPROM 55 for reasons which will be further described below. Alternatively, as further described with respect to FIG. 5, pins 64, 65 could connect the microcomputer 27 directly to EEPROM 55, with current rating and frame rating information stored in the EEPROM 55 at the time of delivery to the customer. This embodiment would eliminate the need for resistors within the rating plug 7. Although separate pins have been described for transferring current rating and frame rating information from the EEPROM 55, it should be understood that such transference could also occur through pins 69, 70, for example, thus reducing the number of pins extending from the rating plug 7 and therefore reducing the chance for breakage.

The World Wide Web ("WWW"), as exemplified by block 110, may be used to modify rating plug 7 on microcomputer based trip unit or ETU 27. The WWW 110 can be used in the present invention to communicate information to the customer's ETU 27 and that information will properly modify the response curve of the ETU 27 according to the customer's wishes. The method provides a technique that detects errors and upon the detection of these errors causes the ETU 27 to revert to a safe mode of operation. Like the mechanical rejection in the current design of prior art rating plugs, there is preferably a digital or firmware rejection scheme that will not allow an improper rating plug 7 to be installed on an ETU 27. For example, with the stored current rating and frame rating of the circuit breaker in the EEPROM 55, it can be determined by the ETU 27 through comparison whether the current rating selected exceeds the frame rating of the circuit breaker, in which case the ETU 27 may reject the attempted rating plug change and shall preferably revert to a safe mode of operation.

The ETU 27 shall preferably further have a method of indicating its new and/or old rating to the customer. This could be a display 112 that is either dedicated to the display of rating information or that is used for another purpose but can enter into a mode that allows it to display rating information.

Figure 4:
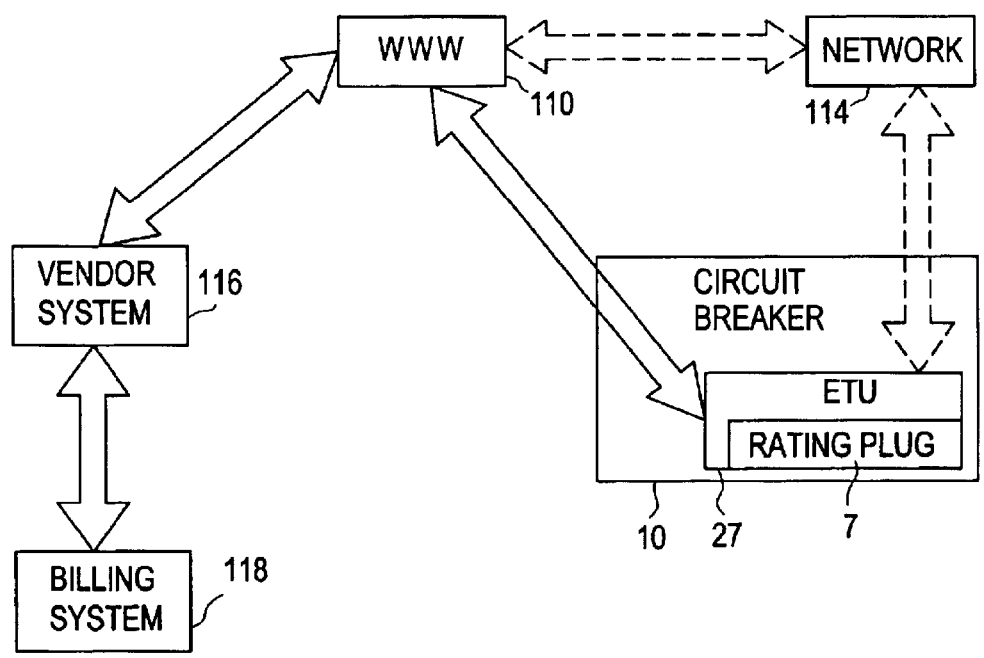
FIG. 4 is a diagrammatic representation of a system in the present method employing the rating plug and ETU of the present invention.

Turning now to FIG. 4, the ETU 27 of the present invention may be designed to either connect directly to the WWW 110 or it may be connected to another network 114 that is then connected to the WWW 110. The ETU firmware shall have a session with the vendor system 116 to communicate the new rating plug information. During this communication there is preferably an interchange of data that will cause the ETU 27 to reject improper rating plug information.

In another aspect of the method of the present invention, the recently communicated rating plug information is preferably verified for validity and determined whether or not it comes from a certified vendor. Such a method may be similar to but not limited to digital keys for vendor verification. The communication is preferably a two-way interchange and coupled to billing systems 118 at the vendor site.

The ETU 27 of the present invention preferably may have circuitry that provides the rating plug scaling information to be stored in some type of non-volatile memory, similar to and communicable with the EEPROM 55 within the rating plug 7. Because this information is critical to the operation of the ETU 27, the integrity of this data at power up and during the operation of the ETU is preferably ensured.

Because the customer is receiving a benefit by altering the operation of the ETU 27, this process may constitute a sale. The customer benefits from this process because he may receive the rating plug function change without the time delay associated with the typical order and delivery process for hard goods. A key benefit to the seller is that there are no hard goods exchanged. Only electronic information is exchanged which may constitute the sale.

Figure 5:
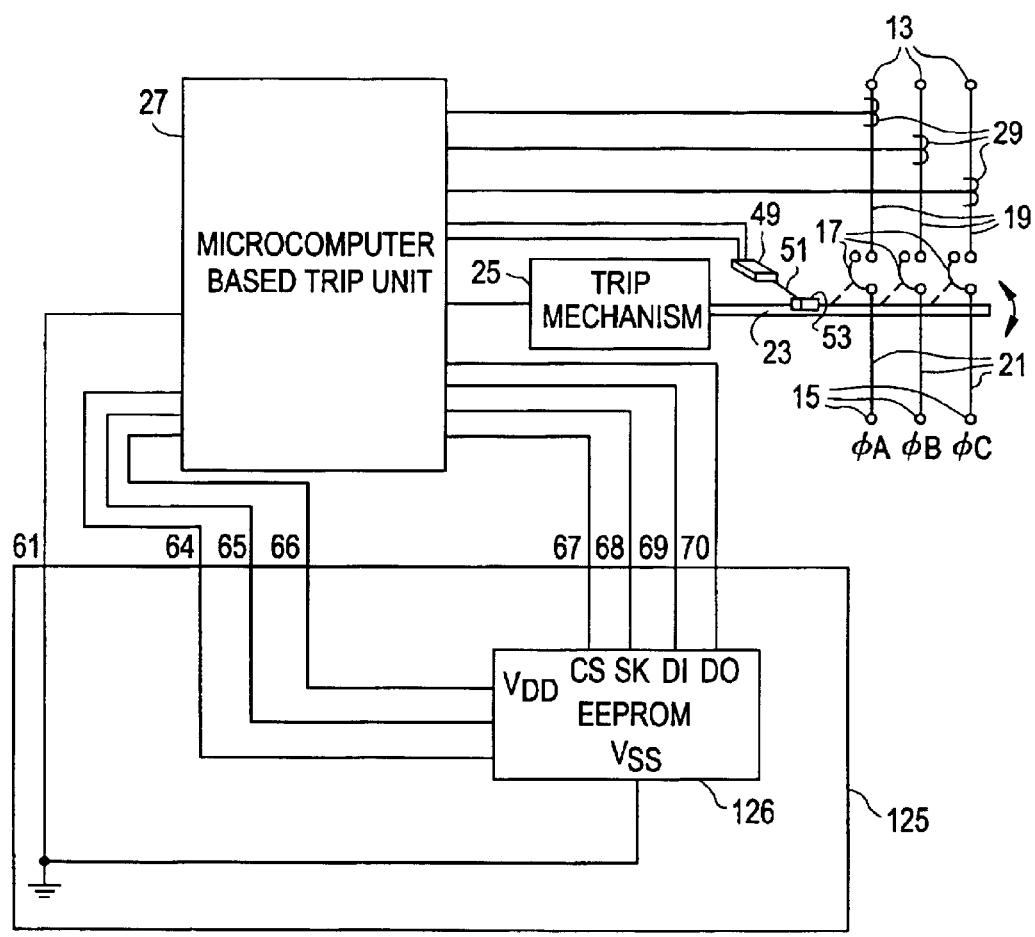
FIG. 5 is a schematic circuit diagram of another embodiment of the present invention usable in the circuit breaker of FIG. 1; and, FIG. 6 is a top plan view of a rating plug for use with the inventive embodiment of FIG. 5.

A completely digital methodology for scaling of circuit breaker response curves in the field is further provided in the present invention. Turning to FIG. 5, a plug-in device 125, such as a rating plug, that has scaling and optioning data programmed into a non-volatile memory 126 is used. The ETU 27 preferably uses a microprocessor for control. The microprocessor will read the digital data from the plug-in memory 126 and use this to mathematically alter its trip response curve.

By using a completely digital method to provide scaling of an ETU 27 used in circuit breakers by field technicians, errors that were commonplace with analog methods that used resistors are eliminated and the number of circuit variations that must be dealt with in the factory are minimized by replacing many resistive circuits with a single memory that may be reprogrammed.

Figure 6:
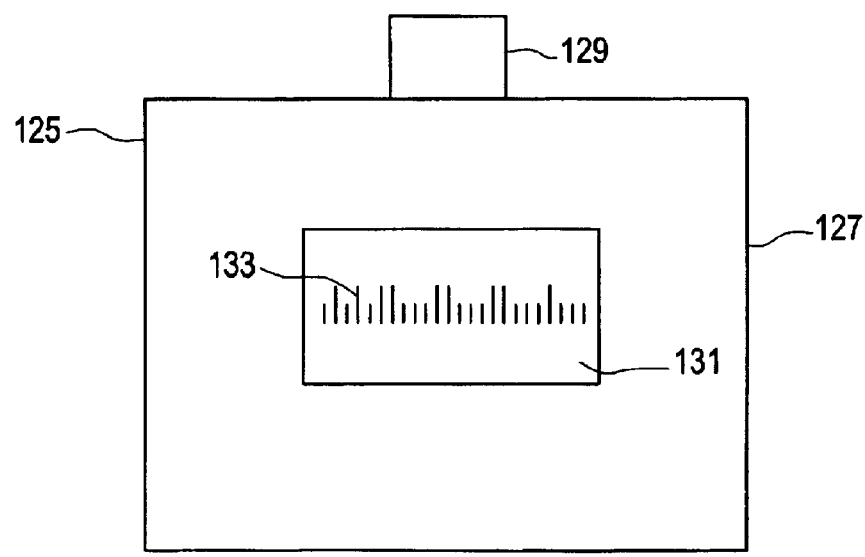

As shown with reference to FIGS. 5 and 6, preferably, the all-digital rating plug 125 is a small circuit in a plastic shell 127 that requires only a programmable non-volatile memory 126, a connector 129, which may hold the pins for installation in the ETU 27, and a label 131. There is no need for resistors on this plug 125 that could be used to scale voltages. Preferably, use rating plug memory 126 is programmed at the factory where it is assembled and then identified with a label 131 containing indicia such as a bar code 133 and/or other alphanumeric identifying indicia. The rating plug 125 is preferably field installable. Upon power up, the microprocessor in the ETU 27 will read the scaling information from the non-volatile programmable memory 126 and use this data to scale its current versus time response curves. This method requires specific analysis to predict the errors that occur from the finite amount of numeric resolution of the analog to digital converter and register based arithmetic.

The all digital rating plug 125 can be used in the system for changing rating plug information of a circuit breaker and a method of remotely altering rating plug information as described in connection with FIG. 4.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A circuit breaker for an electrical circuit comprising:
   an operating mechanism for interrupting current in the electrical circuit when operated;
   an electronic trip unit including a microcomputer which monitors the current in the electrical circuit and generates a trip by automatically operating the operating mechanism to interrupt the current in the electrical current when the current exceeds a selectable value;

a rating plug having means establishing the selectable value of the current at which the electronic trip unit trips the operating mechanism, and a non-volatile memory storing frame rating and current rating of the circuit breaker, wherein the current rating of the circuit breaker is changeable via an Internet connection.

2. The circuit breaker of claim 1 further comprising:

an error detection program within the microcomputer, wherein the error detection program rejects current ratings sent to the electronic trip unit that are greater than the frame rating of the circuit breaker.

3. The circuit breaker of claim 1 further comprising a display for displaying the current rating.

4. A circuit breaker for an electrical circuit comprising:

an operating mechanism for interrupting current in the electrical circuit when operated;

an electronic trip unit including a microcomputer which monitors the current in the electrical circuit and generates a trip by automatically operating the operating mechanism to interrupt the current in the electrical current when the current exceeds a selectable value;

a rating plug having means establishing the selectable value of the current at which the electronic trip unit trips the operating mechanism, and a non-volatile memory storing frame rating and current rating of the circuit breaker; and, an Internet connection extending from the microcomputer, wherein the current rating of the circuit breaker may be changed via the Internet connection.

5. The circuit breaker of claim 4 further comprising an error detection program within the microcomputer, wherein the error detection program rejects current ratings greater than the frame rating.

6. A plug-in digital rating plug for an electronic trip unit of a circuit breaker, the rating plug comprising:

a housing;

a connector for connecting the rating plug to the electronic trip unit; and, a non-volatile memory storing current rating of the circuit breaker, wherein information regarding current rating is sent by the rating plug to the electronic trip unit in digital format only; and, a bar code on the housing for indicating the current rating.

7. The rating plug of claim 6 wherein the connector includes a plurality of connection pins.

8. The rating plug of claim 7 further comprising a plurality of leads connecting the plurality of connection pins to the non-volatile memory.

9. The rating plug of claim 6 wherein the housing is a plastic case.

10. A plug-in digital rating plug for an electronic trip unit of a circuit breaker, the rating plug comprising:

a plastic housing;

a connector for connecting the rating plug to the electronic trip unit; and, a non-volatile memory storing current rating of the circuit breaker, wherein information regarding current rating is sent by the rating plug to the electronic trip unit in digital format only, and wherein the rating plug contains no resistors relating to current rating or frame rating of the circuit breaker.

11. A circuit breaker for an electrical circuit comprising:

an electronic trip unit including a microcomputer;

a removable digital rating plug having a non-volatile memory storing current rating of the circuit breaker;

a connector for connecting the rating plug to the electronic trip unit;

wherein the current rating of the circuit breaker is determined exclusively by the non-volatile memory of the rating plug, and wherein the current rating of the circuit breaker is changeable via an Internet connection.

12. The circuit breaker of claim 11 wherein the rating plug includes a plastic housing.

13. The circuit breaker of claim 11 wherein the rating plug further comprises a label indicating the current rating.

14. The circuit breaker of claim 13 wherein the label includes a bar code.

15. A circuit breaker for an electrical circuit comprising:

an operating mechanism for interrupting current in the electrical circuit when operated;

an electronic trip unit including a microcomputer which monitors the current in the electrical circuit and generates a trip by automatically operating the operating mechanism to interrupt the current in the electrical current when the current exceeds a selectable value;

a non-volatile memory storing current rating of the circuit breaker; and, an Internet connection extending from the microcomputer, wherein the current rating of the circuit breaker may be changed via the Internet connection.

16. The circuit breaker of claim 15 further comprising an error detection program within the microcomputer, wherein the error detection program rejects current ratings greater than a frame rating of the circuit breaker.

17. The circuit breaker of claim 15 further comprising a display for displaying the current rating.

18. A circuit breaker for an electrical circuit comprising:

an operating mechanism for interrupting current in the electrical circuit when operated;

an electronic trip unit including a microcomputer which monitors the current in the electrical circuit and generates a trip by operating the operating mechanism to interrupt the current in the electrical current when the current exceeds a selectable value, the electronic trip unit further establishing the selectable value of the current at which the electronic trip unit trips the operating mechanism;

a non-volatile memory for storing current rating of the circuit breaker; and, an error detection program within the microcomputer, wherein the error detection program rejects current ratings sent to the electronic trip unit that are greater than a frame rating of the circuit breaker; and, wherein the current rating of the circuit breaker is changeable via an Internet connection.

* * * * *